(12) United States Patent
Lendlein

(10) Patent No.: US 8,344,034 B2
(45) Date of Patent: Jan. 1, 2013

(54) SHAPE MEMORY MATERIALS COMPRISING POLYELECTROLYTE SEGMENTS

(75) Inventor: Andreas Lendlein, Berlin (DE)

(73) Assignee: Helmholtz-Zentrum Geesthacht Zentrum fuer Material und Kuestenferschung GmbH, Geesthacht (DE)

( * ) Notice: Subject to any disclaimer, the term of this patent is extended or adjusted under 35 U.S.C. 154(b) by 0 days.

(21) Appl. No.: 13/250,122

(22) Filed: Sep. 30, 2011

(65) Prior Publication Data

US 2012/0029097 A1 Feb. 2, 2012

Related U.S. Application Data

(62) Division of application No. 12/223,813, filed on Dec. 16, 2003, now abandoned.

(30) Foreign Application Priority Data

Feb. 10, 2006 (EP) .................................... 06002740

(51) Int. Cl.
*B01J 41/12* (2006.01)
*B29C 41/00* (2006.01)
*A61B 17/56* (2006.01)
*A61F 2/06* (2006.01)

(52) U.S. Cl. ............ 521/25; 264/230; 606/78; 623/1.18

(58) Field of Classification Search .................... 521/25; 264/230; 606/78; 623/1.18
See application file for complete search history.

(56) References Cited

U.S. PATENT DOCUMENTS

| 5,043,396 A | 8/1991 | Kitahara et al. |
| 6,610,789 B2 * | 8/2003 | Watakabe et al. ............. 525/276 |

FOREIGN PATENT DOCUMENTS

| EP | 0480336 | 4/1992 |
| EP | 1126537 A1 | 8/2001 |
| JP | 63-017952 | 1/1998 |
| WO | WO 03088818 A2 * | 10/2003 |

OTHER PUBLICATIONS

Zhou et al., W-J, "Synthesis of a Novel pH-Responding Polymer with Pendant Barbituric Acid Moieties," Polymer, Elsevier Science Publishers B.V., GV 42(1): 345-349, ISSN: 032-3861 (Jan. 2001).

* cited by examiner

*Primary Examiner* — Michael M Bernshteyn
(74) *Attorney, Agent, or Firm* — VLP Law Group LLP

(57) ABSTRACT

The present invention concerns shape memory materials comprising polyelectrolyte segments. These segments can be used for fixing a permanent shape and/or such segments can also be employed as switching segments responsible for the fixation and release of the temporary shape.

10 Claims, 1 Drawing Sheet

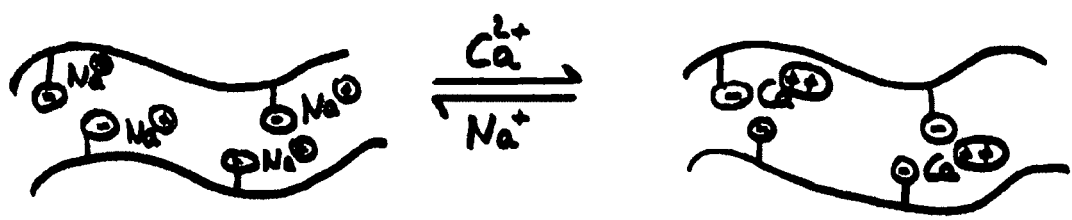
⌒ = POLYELECTROLYTE SEGMENT

SHAPE MEMORY MATERIALS COMPRISING POLYELECTROLYTE SEGMENTS

PRIORITY CLAIM

This is a U.S. national stage of application No. PCT/EP2007/001195, filed on Feb. 12, 2007. Priority is claimed on that application and on the following application: EP Application No. 06002740.6, filed: Feb. 10, 2006. The contents of these two applications are incorporated in their entirety in the present application.

The present invention concerns shape memory materials comprising polyelectrolyte segments. These segments can be used for fixing a permanent shape and/or such segments can also be employed as switching segments responsible for the fixation and release of the temporary shape.

Shape memory materials are an interesting class of materials which have been investigated in recent years. Shape memory property is the ability of a material to remember an original or permanent shape, either after mechanical deformation, which is a one-way effect, or by cooling and heating, which is a two-way effect.

The advantages and intriguing properties of these materials are, in particular, the possibility to initiate a desired change in shape by an appropriate external stimulus, so that an original shape, after deformation, is re-established, and the possibility to deform and program these materials so that highly specific configurations and shape changes can be obtained. While the original shape usually is designated as permanent shape, the deformed shape is often called temporary shape in the art.

The first materials known to have these properties were shape memory metal alloys. In the recent past, shape memory polymers have been developed. Typical shape memory polymers are, for example, phase segregated linear block copolymers, having a hard segment and a soft segment. The hard segment usually is responsible for the definition of the original, i.e. permanent, shape by means of physical interactions, such as crystallization processes, which provide stable fixation points which are not destroyed during subsequent programming steps. The soft segment usually is employed for the definition and fixation of the temporary shape. A usual, conventional shape memory polymer of the type disclosed above, comprising a hard segment and a soft segment, can, for example, be programmed in the following manner. The shape memory polymer is heated to above the melting point or glass transition temperature of the hard segment, allowing the shaping of the material. This original shape, i.e. the permanent shape, can be memorized, i.e. fixed, by cooling the shape memory polymer below the melting point or glass transition temperature of the hard segment. The soft segment also possesses a melting point or a glass transition temperature, which is substantially less than the melting point or glass transition temperature of the hard segment. I.e., the shape memory polymer, after cooling to below the melting point or glass transition temperature of the hard segment can be shaped further, i.e. the temporary shape can be established. This temporary shape can then be fixed by cooling the material to below the melting point or glass transition temperature of the soft segment. The original shape can then be recovered by heating the material to above the melting or glass transition temperature of the soft segment, so that these soft segments become more flexible, so that the material can recover into the original, permanent shape.

Traditional shape memory polymers posses suitable segments enabling temperature dependent shape changes due to melting processes or phase transition processes, such as processes involved with phase changes at a glass transition temperature. Typical materials of this kind are, for example, disclosed in the international publications WO 99/42147 and WO 99/42528.

One drawback associated with such materials is the fact that the fixation of the permanent shape by means of the conventional hard segments often is not satisfactory, since the fixation of the permanent shape by means of this hard segments is due only to rather weak interactions of polymer segments due to crystallization processes, at least in thermoplastic shape memory polymers. A drawback associated therewith is the fact that very slow and minute movements and creeping processes may lead to a loosening of the fixation areas for the permanent shape, so that sometimes the desired shape change cannot be realized, or does not proceed to a satisfactory degree, in view of the fact that the memory of the original shape has vanished, or at least has been diminished, due to such creeping processes. In thermoset materials, wherein the permanent shape is memorized, i.e. fixed, by means of covalent crosslinking points of the polymeric network, the above-outlined drawback of the thermoplastic materials has been overcome. Nevertheless, such covalent crosslinking points have the drawback that the permanent shape cannot be altered anymore after the formation of the covalent crosslinking points.

The international application WO 03/088818 discloses biodegradable shape memory polymeric sutures which are characterized according to the claims in that they are prepared with shape memory material being temperature sensitive. The examples of this document focus on shape memory materials prepared with caprolactone macromonomers, dioxanone macromonomers, linked by urethane groups.

The materials as evaluated and described are thermally sensitive shape memory materials for which the permanent shape as well as the temporary shape are programmed using thermal programming methods. JP-A-63-017952 discloses temperature dependent material having shape-memorizing properties. According to this document an original shape can be recovered by rise and temperature and the material as disclosed therein is in particular described as being an optical material.

U.S. Pat. No. 5,043,396 discloses a crosslinked polymer having shape-memorizing property, said crosslinked polymer being obtained by thermally reversely crosslinking a base polymer comprising specific segments. Again, these segments also comprise ionically crosslinkable groups which are, however, employed as temperature sensitive crosslinking points. Overall, the material disclosed in U.S. Pat. No. 5,043,396 is a temperature sensitive material.

EP 1126537 A1 discloses block polymers useful for a polymer electrolyte fuel cell. This document does not disclose shape memory materials but employs the block polymer disclosed as membrane forming polymer electrolyte. W. J. Zhou discloses in Polymer 42 (2001) 345-349 the synthesis of a novel pH responding polymer with pendant barbituric acid moieties. The polymer disclosed was evaluated with respect to pH responding behavior in water and it is disclosed that at certain pH values a transparent yellow colored solution could be obtained, whereas at other pH values the polymer most precipitated and the solution became opaque. Shape memory properties are not disclosed. EP 0480336 A2 discloses amphiphilic elastomeric block copolymers which are to be employed as binders in light sensitive, i.e. light curing elastomeric mixtures. Shape memory properties are not disclosed.

OBJECT OF THE PRESENT INVENTION

Accordingly, the present invention aims at providing a shape memory material overcoming the drawbacks associated with the conventional thermoplastic and thermoset materials known from the prior art.

BRIEF DESCRIPTION OF THE INVENTION

The above object has been solved with the shape memory material in accordance with claim 1. Preferred embodiments are defined in the sub-claims. Furthermore, the present invention provides the use of these materials as defined in the claims. Preferred embodiments are again defined in the respective dependent sub-claims. Furthermore, the following description illustrates further embodiments of the present invention.

BRIEF DESCRIPTION OF THE FIGURE

FIG. 1 shows schematically the use of a cation exchange (monovalent/divalent) for enabling or extinguishing ionic interactions between two polymer segments, a mechanism which may be used for the fixation of the temporary as well as of the permanent shape (and the initiation of the shape memory effect as well as for the loosening the permanent shape so that reshaping is possible).

DETAILED DESCRIPTION OF THE PRESENT INVENTION

The present invention provides shape memory materials comprising segments derived from polyelectrolytes.

Polyelectrolyte segments in accordance with the present invention are segments comprising a vast number of ionic groups, which may either be elements of the main chain of the segment or which may be elements of side chains of the main chain of the polyelectrolyte segment.

A polyelectrolyte segment in accordance with the present invention furthermore refers to a segment having a molecular weight of up to 15000, preferably 400 to 15000, more preferably 500 to 15000. Suitable embodiments of the molecular weight are also the ranges of from 1000 to 10000 and from 2500 to 7500.

The polyelectrolyte segments to be employed in accordance with the present invention can be distinguished as already indicated above very generally into segments wherein the ionic groups are comprised within the main chain (for example ionene) or they may be provided within side chains, such as in quarternized poly(4-vinylpyridin). The polyelectrolyte segments to be employed in accordance with the present invention furthermore can be classified broadly into polyacidic segments or polybasic segments. Polyacidic segments give rise to polyanions, while polybasic segments are segments comprising groups able to react with proton providing substances under the formation of salts. Typical examples of polyacidic polyelectrolyte segments are segments derived from polyphosphoric acid, segments derived from polyvinyl sulfuric acid, segments derived from polyvinyl sulfonic acid, segments derived from polyvinyl phosphonic acid and segments derived from polyacrylic acid. These groups can be derivatized further in any suitable manner. Other examples are alginate derived segments, i.e. segments derived from alginic acid. One advantage of these segments is the fact that alginates have long been used as thickeners or as components of pharmaceutical preparations, such as capsules, so that these materials are readily available from commercial sources. Furthermore there exists already knowledge concerning the processing of such materials.

Typical segments derived from polybasic polyelectrolytes are segments derived from polyethylene amine, polyvinyl amine and polyvinyl pyridine.

A third class of polyelectrolyte segments are ampholytic segments, comprising anionic as well as cationic groups, i.e. segments which give rise to polyions in suitable polar solvents.

All these types of polyelectrolyte segments may be employed in accordance with the present invention. Further polyelectrolytes which may be used as building blocks for segments of shape memory materials in accordance with the present invention may be selected from conventional polymers derivatized with groups providing anionic or cationic groups and conventional polyelectrolytes, such as polyallyl ammonium chloride, polyallyl ammonium phosphate, polydiallyldimethyl ammonium chloride, polybenzyltrimethyl ammonium chloride, polydiallyldimethyl ammonium chloride-co-N-isopropyl acryl amide, polysodiumtrimethylene oxyethylene sulfonate, polydimethyldodecyl-2-acrylamidoethyl-ammonium bromide, poly-4-N-butylpyridinium methylene bromide, poly-2-N-methylpyridiniumethylene iodine, poly-N-methylpyridinium-2-5-diethylene, poly-4-4'-bipyridiniumdiayl-N,N'-decamethylenedibromide and betaine-derived polymers.

Important, in accordance with the present invention, is the fact that the polyelectrolyte segments to be employed in accordance with the present invention comprise groups enabling an ionic interaction between polymer segments.

Polyelectrolyte segments to be employed in accordance with the present invention furthermore give rise to ionic interactions so that these segments are not temperature sensitive but respond to chemical modifications, such as ion exchange, change in pH value, ionic strength etc. Contrary to conventional temperature sensitive shape memory materials, the materials in accordance with the present invention comprise at least one segment which reacts to the above-mentioned chemical modifications which are illustrated further below.

With such polyelectrolyte segments the following embodiments can be realized. In this respect it is important to recognize that the shape memory polymers disclosed herein are described using the conventional designation of the segments of the shape memory polymers, i.e. hard and soft segments, wherein the hard segments are responsible for the permanent shape and the soft segments are the switching segments.

Polyelectrolyte Segments as Hard Segments

Polyelectrolyte segments, such as exemplified above, may be used as replacement for hard segments in shape memory polymers, i.e. for fixing the permanent shape. The advantage of such shape memory polymers, preferably thermoplastic polymers, is the fact that the ionic interaction between the "hard segments", provided in particular by suitable (polyvalent) counter ions, provides much stronger interactions, compared with conventional hard segments wherein the permanent shape is memorized and fixed by means of interactions between polymer chains in a polymer crystallite. Ionic interactions as provided with the shape memory material in accordance with the present invention enable much stronger interactions, so that the above-outlined problems as associated with the conventional thermoplastic materials, due to creep processes, can be avoided. Due to the strong ionic interactions between the segments a high shape fixity can be obtained, i.e. the permanent shape is retained/recovered with a very high accuracy. Polyelectrolyte segments as hard segments do show a lesser tendency towards relaxation, compared with conventional hard segments which might show lower degrees of shape fixity due to creep processes within the material. This enables the preparation of shape memory polymers with better shape memory properties, in particular the storage stability and long-term shape fixity are improved.

Furthermore it is also possible to define in principle any shape as the permanent shape, as with conventional shape memory polymers, since this permanent shape may be reshaped by appropriate processes. One example of such a shaping process suitable for shape memory polymers comprising polyelectrolyte segments are molding processes using solutions, such as aqueous solutions of shape memory polymers. These solutions may be cast into a desired shape and the solvent is then removed by appropriate treatments, or, as alternative, the shape memory polymer is solidified by precipitation processes.

At the same time, the drawbacks associated with thermoset materials, providing the network fixation points by means of covalent links, can also be overcome. In view of the fact that the permanent shape in accordance with this embodiment of the present invention is memorized by means of ionic interactions between polyelectrolyte segments, it is possible to change the permanent shape by appropriate processing steps, such as neutralizing steps or salt formation steps weakening the ionic interaction between the polyelectrolyte segments. This enables a deformation of the material leading to a new permanent shape, which then can again be memorized, i.e. fixed by appropriately reversing the decrease in ionic interaction by appropriate chemical manipulation.

In accordance with the present invention, it is therefore possible to provide hard segments, i.e. segments responsible for the permanent shape, which are sensitive towards chemical modifications, such as pH variations or ion exchange (see FIG. 1), enabling the advantages as described above. Conventional temperature sensitive shape memory polymers comprise crystallizing segments as hard segments which, in thermoplastic materials, can be shaped and programmed by means of a temperature rise and the respective permanent shape is then fixed by means of the interactions resulting upon the cooling and crystallization of the segments. The present invention provides a different means for providing hard segments not envisaged by the prior art.

In accordance with this embodiment, shape memory materials can be provided having much improved recovery properties for the permanent shape in view of the fact that the ionic interactions provided in accordance with the present invention enable far stronger interactions, compared with the conventional interactions in traditional shape memory polymers.

Polyelectrolyte Segments as Soft Segments

An alternative embodiment in accordance with the present invention uses the polyelectrolyte segments as switching segments, i.e. as replacement for conventional soft segments. In this embodiment, the possibility to increase and to decrease the ionic interaction between different segments of a shape memory material in a reversible manner by means of a suitable manipulation is used in order to fix the temporary shape of a shape memory material. Such a shape memory material comprises either conventional network points or hard segments necessary for the memory concerning the permanent shape, or this material also employs polyelectrolyte derived segments as replacement for conventional hard segments or covalent network points, as outlined above. The temporary shape is then fixed by chemical manipulation leading to strong ionic interaction between polyelectrolyte segments in the deformed state. A recovery of the permanent shape can be triggered by appropriately changing the chemical composition with respect to the polyelectrolyte segments, for example, by providing additional reagents leading to a change in pH value or to salt exchange reactions. In this connection, it is, for example, possible to replace a bridging divalent or trivalent cation, responsible for ionic interaction between anionic polyelectrolyte segments, by monovalent cations so that the bridging or crosslinking of different polyelectrolyte segments ceases to be present. This generates more freedom of movement of the segments by liberating the polyelectrolyte segments from one another so that a recovery of the original, permanent shape is made possible.

It is important to recognize in this respect that the temporary shape is defined by means of the described interactions between polyelectrolyte segments, so that a temperature shape can be programmed which is responsive towards a chemical modification, such as pH variation or ion exchange (see FIG. 1). This is a clear difference with respect to the prior art which relies, as far as soft segments or switching segments are concerned, on temperature controlled, temperature sensitive materials, such as polyester segments or temperature sensitive ionic groups.

In one embodiment of using the polyelectrolyte segments as soft (switching) segments same are anionic segments initially present in association with monovalent, i.e. non-bridging cations. After a suitable deformation to the temporary shape the monovalent cations (such as $H^+$, $Na^+$, $Li^+$, $K^+$, $NH_4^+$, etc. as well as organic cations) are exchanged and replaced by multivalent cations, preferably di- or trivalent cations (such as $Ca^{++}$, $Mg^{++}$, $Ba^{++}$, $Cu^{++}$, $Al^{+++}$, $Fe^{+++}$ etc. as well as organic cations), so that strong ionic interactions between the polyelectrolyte segments fix the temporary shape. The shape memory effect, i.e. the recovery of the permanent shape may then be initiated by replacing the bridging cations again with monovalent cations so that the interactions between the polyelectrolyte segments are reduced and finally extinguished, or by adding a solvating agent for the bridging ions so that a weakening of the bridges is achieved by a "dilution" type mechanism, so that the polymer recovers the permanent shape.

Another possibility is the initiation of the shape memory effect by altering the pH value, again with the aim of reducing and finally extinguishing interactions, which fix the temporary shape, between the polyelectrolyte segments.

The use of polyelectrolyte segments as soft segments in shape memory polymers widens considerably the range for suitable applications. In particular soft segments derived from polyelectrolyte segments enable the use of novel external stimuli for triggering the shape memory effect. Previously mainly temperature and light sensitive shape memory polymers have been reported. The novel materials in accordance with the present invention enable the use of other stimuli, such as ionic strength, pH value, type of ion (monovalent/multivalent cations, see above) etc. Such external stimuli further open new types of application, since the shape memory polymers in accordance with the present invention may be used in moist/liquid environments, since initiation of the shape memory effect requires the possibility to carry out ion exchange etc. which mainly may be realized in liquid systems. Accordingly the materials have to enable at least a certain degree of swelling, for example, in order to allow such reactions.

Shape memory polymers in accordance with the present invention comprising soft segments from polyelectrolyte segments may be prepared in the form of thermoplastic materials, such as multiblock copolymers, or in the form of network polymers, typically comprising covalent crosslinking. Preferred in accordance with the present invention are network materials. In such materials the degree of swelling may be controlled by appropriately selecting the building blocks, i.e. higher contents of hydrophobic components reduce the degree of swelling. Network structures envisaged by the present invention comprise covalent networks as well as IPN or semi-IPN materials. It is for example possible to introduce soft segments as chain like molecules into a network, by suitable processes, for example loading of the network by swelling within a solution of polyelectrolyte segments, followed by drying. The semi-IPN obtained thereby can be deformed and the temporary shape may be fixed by using a cation exchange reaction as exemplified above in order to provide a physical network of the polyelectrolyte segments interpenetrating the covalent network structure and fixing thereby the temporary shape. The shape memory effect may again be triggered by a further cation exchange, as illustrated above, so that the physical network of the polyelectrolyte segments is destroyed so that the permanent shape can be recovered.

Polyelectrolyte Segments as Hard and Soft Segments

In a further embodiment, the polyelectrolyte segments serve as permanent crosslinking network points for the permanent shape as well as switching segments for providing the temporary shape. In this connection, it is only necessary to appropriately select the chemical nature of the polyelectrolyte segments so that suitable reaction sequences (such as neutralization, salt formation etc.) can be employed in order to provide the material with the memory of a permanent shape and a temporary shape.

Assembly of Segments

Concerning the assembly of segments, chemical reactions required therefore as well as concerning segment length, molecular weight etc. reference is made to the above mentioned international applications WO 99/42147 and WO 99/42528 which are incorporated herein in this respect by reference.

Materials in accordance with the present invention can in particular be used as sensors, for example, as pH sensors or as sensors for ions, such as polyvalent metal ions, since any change in pH value or in the concentration of such polyvalent (or monovalent) cations may lead to a change of the shape (or any other property) of the shape memory material. Accordingly, the materials in accordance with the present invention have a great utility.

Shape Memory Properties

The materials in accordance with the present invention due to the use of polyelectrolyte segments, enable to tailor shape memory properties. Those properties can be determined using the methods as disclosed in the earlier applications of the present applicant Mnemoscience and relevant properties are in particular Recovery, i.e. the accuracy with which a permanent shape is recovered after the triggering of the shape memory effect, and Fixity, i.e. the accuracy with which a temporary shape can be fixed. It is for example possible to adjust these properties by changing the type of ions employed, i.e. by using ions with differing bonding strengths. Ions with high bonding strengths will for example increase Fixity and also Recovery, depending on the question whether the polyelectrolyte segment is employed as hard or soft segment.

Further it is preferable to employ segments which will enable that the shape memory material can be wetted with water and/or that water can penetrate into the material to induce the shape memory effect. Another option might be the use of organic solvents, which may be miscible with water, in order to increase interaction with the shape memory material. A further option is the use of surfactants, which may also be incorporated into the polymeric material.

Programming

In accordance with the above description, it is clear that the shape memory materials as described herein, comprising polyelectrolyte segments, either as hard segments, as soft segments or as hard as well as soft segments, can be programmed in a manner involving the corresponding chemical modification, such as pH variation and ion exchange as illustrated above for the individual segments. Such programming methods clearly deviate from the pure temperature dependent programming methods described in the prior art for the temperature sensitive shape memory materials. As outlined in detail above, the permanent crosslinks for the permanent shape (i.e. hard segments) as well as the temporary crosslinks for the temporary shape (i.e. soft segments) are prepared by chemical methods involving a change in pH or an ion exchange, for example the exchange of a monovalent counter ion giving rise to no crosslinking effect with a divalent counter ion, giving rise to a crosslinking effect (see FIG. 1), so that the methodology as disclosed in the prior art in connection with temperature sensitive shape memory polymers cannot simply be adapted to shape memory materials comprising polyelectrolyte segments as disclosed in the present application.

The invention claimed is:

1. A sensor for detecting an exchange of ions, a change in pH value, or a change in ionic strength via a change of shape, the sensor comprising a shape memory polymer comprising at least one hard segment for fixing a permanent shape and at least one soft segment for fixing and releasing a temporary shape, wherein at least one of the at least one hard segment and the at least one soft segment comprises a polyelectrolyte segment enabling an ionic interaction between the polymer segments for fixing the permanent shape and/or for fixing and releasing the temporary shape, respectively, and wherein the polyelectrolyte segments respond to a chemical change in environment, including an exchange of ions, a change in pH value or a change in ionic strength, and wherein the shape memory polymer responds to the chemical change in environment by a change of shape.

2. The sensor of claim 1, wherein the soft segment comprises a polyelectrolyte segment.

3. The sensor of claim 1, wherein the hard segment comprises a polyelectrolyte segment.

4. The sensor of claim 1, wherein the polyelectrolyte segment is an anionic segment.

5. The sensor of claim 1, wherein the polyelectrolyte segment is a cationic segment.

6. The sensor of claim 1, wherein upon bridging multivalent cations the polyelectrolyte segment fixes the permanent shape or the temporary shape.

7. The sensor of claim 1, wherein the chemical change in environment the shape memory polymer responds to is a reduction of an ionic interaction between the polyelectrolyte segments.

8. The sensor of claim 1, wherein the shape memory polymer is a network material.

9. The sensor of claim 7, wherein the reduction of the ionic interaction is due to a cation exchange replacing multivalent, bridging cations with monovalent cations.

10. A sensor for detecting an exchange of ions, a change in pH value, or a change in ionic strength via a change of shape, the sensor comprising a shape memory polymer comprising at least one hard segment for fixing a permanent shape and at least one soft segment for fixing and releasing a temporary shape, wherein at least one of the at least one hard segment and the at least one soft segment comprises a polyelectrolyte segment enabling an ionic interaction between the polymer segments for fixing the permanent shape and/or for fixing and releasing the temporary shape, respectively, and wherein the shape memory polymer has been subjected to a programming process involving a chemical modification, including an exchange of ions, a change in pH value or a change in ionic strength, such that the polyelectrolyte segments are capable to respond to a corresponding chemical change in environment, including an exchange of ions, change in pH value and change in ionic strength, respectively, and wherein the shape memory polymer responds to the chemical change in environment by a change of shape.

* * * * *